(12) United States Patent
Nishizawa

(10) Patent No.: US 8,670,045 B2
(45) Date of Patent: Mar. 11, 2014

(54) INFORMATION PROCESSING APPARATUS, CONTROL METHOD THEREOF, AND COMPUTER READABLE STORAGE MEDIUM

(75) Inventor: Hideta Nishizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 263 days.

(21) Appl. No.: 13/097,949

(22) Filed: Apr. 29, 2011

(65) Prior Publication Data

US 2011/0279726 A1    Nov. 17, 2011

(30) Foreign Application Priority Data

May 12, 2010 (JP) ................................. 2010-110591

(51) Int. Cl.
*H04N 5/76* (2006.01)

(52) U.S. Cl.
USPC ................................... 348/231.3; 348/211.11

(58) Field of Classification Search
USPC ........ 348/231.99–231.9, 239, 211.99, 211.11
See application file for complete search history.

(56) References Cited

U.S. PATENT DOCUMENTS

| 2010/0277615 | A1* | 11/2010 | Watazawa | 348/231.5 |
| 2010/0289920 | A1* | 11/2010 | Mizuno | 348/231.3 |
| 2011/0032385 | A1* | 2/2011 | Yang | 348/231.3 |
| 2012/0081575 | A1* | 4/2012 | Takahashi | 348/231.3 |

FOREIGN PATENT DOCUMENTS

| CN | 101146178 A | 3/2008 |
| JP | 2003-092719 | 3/2003 |
| JP | 2003-108457 | 4/2003 |
| JP | 2007-215072 | 8/2007 |

OTHER PUBLICATIONS

The above references was cited in a Aug. 30, 2012 Chinese Office Action, which is enclosed with an English Translation, that issued in Chinese Patent Application No. 201110125985.7.

* cited by examiner

*Primary Examiner* — Tuan Ho
(74) *Attorney, Agent, or Firm* — Cowan, Liebowitz & Latman, P.C.

(57) ABSTRACT

An information processing apparatus which acquires, from another information processing apparatus, data stored in the other information processing apparatus, comprising, a storage unit storing data, a selection unit selecting data stored in the storage unit, a generation unit generating, based on the selected data, condition information that determines a condition for specifying data to be requested to the other information processing apparatus, and a communication unit transmitting the condition information to the other information processing apparatus and receiving, from the other information processing apparatus, data that satisfies the determined condition. The storage unit stores information about a generation location of the data in association with the data, and the generation unit generates, based on information about generation locations of the selected data, condition information that determines a condition regarding a range of locations where data to be acquired from the other information processing apparatus were generated.

11 Claims, 12 Drawing Sheets

F I G. 3

CAMERA A

| FILE NAME | SHOOTING DATE & TIME | SHOOTING LOCATION | MAIN BODY DATA | THUMBNAIL DATA |
|---|---|---|---|---|
| A01.jpg | 2008/11/18 10:00:00JST | 139° EAST LONGITUDE 35° NORTH LATITUDE | ... | ... |
| A02.jpg | 2008/11/18 11:00:00JST | 140° EAST LONGITUDE 35° NORTH LATITUDE | ... | ... |
| A03.jpg | 2008/11/18 12:00:00JST | 140° EAST LONGITUDE 34° NORTH LATITUDE | ... | ... |
| A04.jpg | 2008/11/18 13:00:00JST | 139° EAST LONGITUDE 34° NORTH LATITUDE | ... | ... |
| A05.jpg | 2008/11/18 14:00:00JST | 139.5° EAST LONGITUDE 34° NORTH LATITUDE | ... | ... |

CAMERA B

| FILE NAME | SHOOTING DATE & TIME | SHOOTING LOCATION | MAIN BODY DATA | THUMBNAIL DATA |
|---|---|---|---|---|
| B01.jpg | 2008/11/18 09:00:00JST | 141° EAST LONGITUDE 35° NORTH LATITUDE | ... | ... |
| B02.jpg | 2008/11/18 11:00:00JST | 139.5° EAST LONGITUDE 34.25° NORTH LATITUDE | ... | ... |
| B03.jpg | 2008/11/18 12:00:00JST | 139.75° EAST LONGITUDE 34.5° NORTH LATITUDE | ... | ... |
| B04.jpg | 2008/11/18 15:00:00JST | 139.25° EAST LONGITUDE 33.5° NORTH LATITUDE | ... | ... |

FIG. 7

CAMERA C

| FILE NAME | SHOOTING TIME | SHOOTING LOCATION | MAIN BODY DATA | THUMBNAIL DATA |
|---|---|---|---|---|
| C11.jpg | 10:00 | TUG-OF-WAR | ... | ... |
| C12.jpg | 10:01 | TUG-OF-WAR | ... | ... |
| C13.jpg | 10:16 | MOCK CAVALRY BATTLE | ... | ... |
| C14.jpg | 10:17 | MOCK CAVALRY BATTLE | ... | ... |
| C15.jpg | 10:17 | MOCK CAVALRY BATTLE | ... | ... |
| C16.jpg | 10:18 | MOCK CAVALRY BATTLE | ... | ... |
| C17.jpg | 10:19 | MOCK CAVALRY BATTLE | ... | ... |
| C18.jpg | 10:31 | BALL TOSS | ... | ... |
| C19.jpg | 10:31 | BALL TOSS | ... | ... |

CAMERA D

| FILE NAME | SHOOTING TIME | SHOOTING LOCATION | MAIN BODY DATA | THUMBNAIL DATA |
|---|---|---|---|---|
| D11.jpg | 9:40 | ROLL-A-BIG-BALL | ... | ... |
| D12.jpg | 9:41 | ROLL-A-BIG-BALL | ... | ... |
| D13.jpg | 10:15 | MOCK CAVALRY BATTLE | ... | ... |
| D14.jpg | 10:16 | MOCK CAVALRY BATTLE | ... | ... |
| D15.jpg | 10:17 | MOCK CAVALRY BATTLE | ... | ... |
| D16.jpg | 10:18 | MOCK CAVALRY BATTLE | ... | ... |
| D17.jpg | 10:19 | MOCK CAVALRY BATTLE | ... | ... |
| D18.jpg | 10:22 | FOOTRACE | ... | ... |
| D19.jpg | 10:23 | FOOTRACE | ... | ... |

FIG. 11A

INTERNAL STORAGE UNIT

| FILE NAME | UPDATE DATE & TIME | EXTENSION | MAIN BODY DATA |
|---|---|---|---|
| E01 | 2010/4/30/15:00 | .txt | ..... |
| E02 | 2010/4/30/15:10 | .pdf | ..... |
| E03 | 2010/4/30/16:00 | .txt | ..... |
| E04 | 2010/4/30/16:10 | .pdf | ..... |
| E05 | 2010/4/30/16:50 | .pdf | ..... |
| E06 | 2010/4/30/17:00 | .txt | ..... |

FIG. 11B

REMOVABLE STORAGE MEDIUM

| FILE NAME | UPDATE DATE & TIME | EXTENSION | MAIN BODY DATA |
|---|---|---|---|
| F01 | 2010/4/30/16:00 | .pdf | ..... |
| F02 | 2010/4/30/16:10 | .pdf | ..... |
| F03 | 2010/4/30/16:20 | .txt | ..... |
| F04 | 2010/4/30/16:30 | .txt | ..... |
| F05 | 2010/4/30/16:40 | .pdf | ..... |
| F06 | 2010/4/30/16:50 | .pdf | ..... |

INFORMATION PROCESSING APPARATUS, CONTROL METHOD THEREOF, AND COMPUTER READABLE STORAGE MEDIUM

BACKGROUND OF THE INVENTION

1. Field of the Invention

The present invention relates to an information processing apparatus, control method thereof, and computer readable storage medium.

2. Description of the Related Art

There is a growing opportunity to share image data obtained by a digital camera or the like among friends or families. As a sharing method, it is popular to hand over an image to a partner through a removable storage medium or network. Recently, Japanese Patent Laid-Open No. 2003-92719 discloses a digital camera capable of receiving, without the mediacy of a personal computer, only image data the user wants, out of images which are obtained by another digital camera or the like and recorded in its internal storage medium.

Japanese Patent Laid-Open No. 2007-215072 discloses a technique of acquiring thumbnail images by a partner digital camera, selecting the thumbnail image of an image the user wants from the acquired thumbnail images, and acquiring the actual image of the selected thumbnail.

As a technique of sharing contents, Japanese Patent Laid-Open No. 2003-108457 discloses a technique of comparing associated information (metadata) of data sent from a terminal which provides contents, with metadata the user wants, and when these metadata match each other, setting up a communication path.

SUMMARY OF THE INVENTION

In these proposed techniques, when an image data sharing request is issued, image data are transmitted regardless of the data amount at the providing destination. It takes a long time to confirm all images, even when they are thumbnail images. In some methods, the date or location is directly input to designate the range of contents to be provided. However, the burden of directly inputting the designation is newly generated. If an image is to be shared a long time after the shooting time, the user may forget an accurate time or location, and designate an unintended range.

The present invention provides a technique capable of easily designating the range the user intends without the burden on him.

One aspect of embodiments of the present invention relates to an information processing apparatus which acquires, from another information processing apparatus, data stored in the other information processing apparatus, comprising, a storage unit configured to store data, a selection unit configured to select data stored in the storage unit, a generation unit configured to generate, based on the data selected by the selection unit, condition information that determines a condition for specifying data to be requested to the other information processing apparatus, and a communication unit configured to transmit the condition information to the other information processing apparatus and to receive, from the other information processing apparatus, data that satisfies the condition determined by the condition information, wherein the storage unit stores information about a generation location of the data in association with the data, and the generation unit generates, based on information about generation locations of a plurality of data selected by the selection unit, condition information that determines a condition regarding a range of locations where data to be acquired from the other information processing apparatus were generated.

Another aspect of embodiments of the present invention relates to an information processing apparatus which acquires, from another information processing apparatus, data stored in the other information processing apparatus, comprising, a storage unit configured to store data, a selection unit configured to select more than two data stored in the storage unit; a generation unit configured to generate, based on the more than two data selected by the selection unit, condition information that determines a condition for specifying data to be requested to the other information processing apparatus, and a communication unit configured to transmit the condition information to the other information processing apparatus and to receive, from the other information processing apparatus, data that satisfies the condition determined by the condition information, wherein the storage unit stores time information about a generation or update date and time of the data in association with the data, and the generation unit generates, based on pieces of time information of the more than two data selected by the selection unit, condition information that determines a condition regarding a range of times when data to be acquired from the other information processing apparatus were generated or updated.

Further aspect of embodiments of the present invention relates to an information processing apparatus which includes a storage unit for storing data, and when a detachable removable storage medium that stores data is mounted, copies data in the removable storage medium to the storage unit, comprising, a selection unit configured to select data stored in the storage unit, a generation unit configured to generate, based on the data selected by the selection unit, condition information that determines a condition for specifying data to be copied from the removable storage medium, and a control unit configured to copy, from the removable storage medium to the storage unit, data that satisfies the condition determined by the condition information, wherein the storage unit and the removable storage medium respectively store time information about a generation or update date and time of the data and a type of the data in association with the data, and the generation unit generates, based on pieces of time information and types of a plurality of data selected by the selection unit, condition information that determines a condition regarding a range of times when data to be copied from the removable storage medium were generated or updated, and a condition regarding a type of data to be copied.

Further features of the present invention will become apparent from the following description of exemplary embodiments (with reference to the attached drawings).

BRIEF DESCRIPTION OF THE DRAWINGS

FIG. 3 is a table exemplifying an image list in a camera which exchanges an image in the first embodiment;

FIG. 7 is a table exemplifying an image list in a camera which exchanges an image in the second embodiment;

FIGS. 11A and 11B are tables each exemplifying a list in a PC which exchanges data in the third embodiment.

DESCRIPTION OF THE EMBODIMENTS

Exemplary embodiments of the present invention will now be described with reference to the accompanying drawings.

[First Embodiment]

Figure 1:
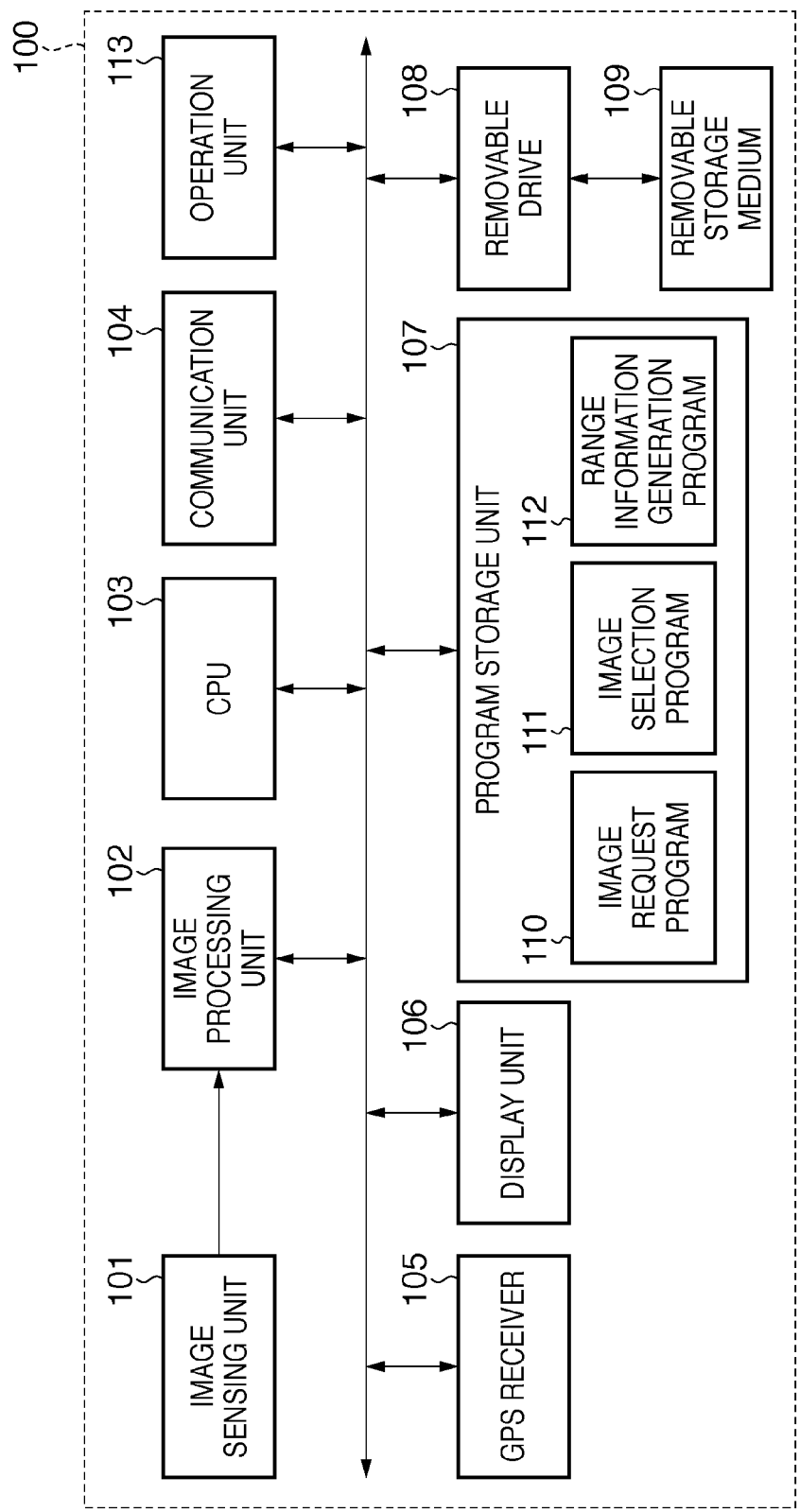
FIG. 1 is a block diagram exemplifying the arrangement of an information processing apparatus according to the first embodiment.

FIG. 1 is a block diagram exemplifying the arrangement of an information processing apparatus according to the first embodiment. Referring to FIG. 1, an image sensing unit 101 in an information processing apparatus 100 converts an optical signal into an electrical signal. An image processing unit 102 converts the electrical signal from the image sensing unit 101 into image data of a predetermined format (for example, JPEG). The converted image data is recorded on a removable storage medium 109 via a removable drive 108.

A CPU 103 controls the information processing apparatus 100 by executing a program stored in a program storage unit 107. A communication unit 104 is a communication interface that communicates with another information processing apparatus or connects to an external network such as the Internet. Examples of the communication protocol which can be used by the communication unit 104 may include TCP/IP, USB, IEEE1394, IEEE802.11n, and Bluetooth. A GPS receiver 105 receives a GPS signal, and converts it into positional information about the latitude and longitude. The positional information can be recorded together with image data as associated information for specifying the shooting location of the image data. A display unit 106 displays image data stored in the removable storage medium 109 and image data processed by the image processing unit 102. For the display method, one image data may be displayed on the entire screen, or the screen may be divided to display a plurality of image data. One image data and information regarding the image data may be displayed simultaneously. The display unit 106 is formed from a liquid crystal panel or organic EL panel.

The program storage unit 107 stores computer programs to be executed by the CPU 103. These computer programs include an image request program 110, image selection program 111, and range information generation program 112. The program storage unit 107 is formed from a ROM, RAM, hard disk, and the like. The removable drive 108 controls read/write of data from/in the removable storage medium 109. The removable storage medium 109 is a nonvolatile storage medium detachable from the information processing apparatus 100. The removable storage medium 109 is mounted in the removable drive 108 and used. An operation unit 113 provides various buttons for accepting a shooting instruction, selection instruction, and the like from the user. The operation unit 113 includes a shutter button, menu button, and cursor button.

Figure 2:
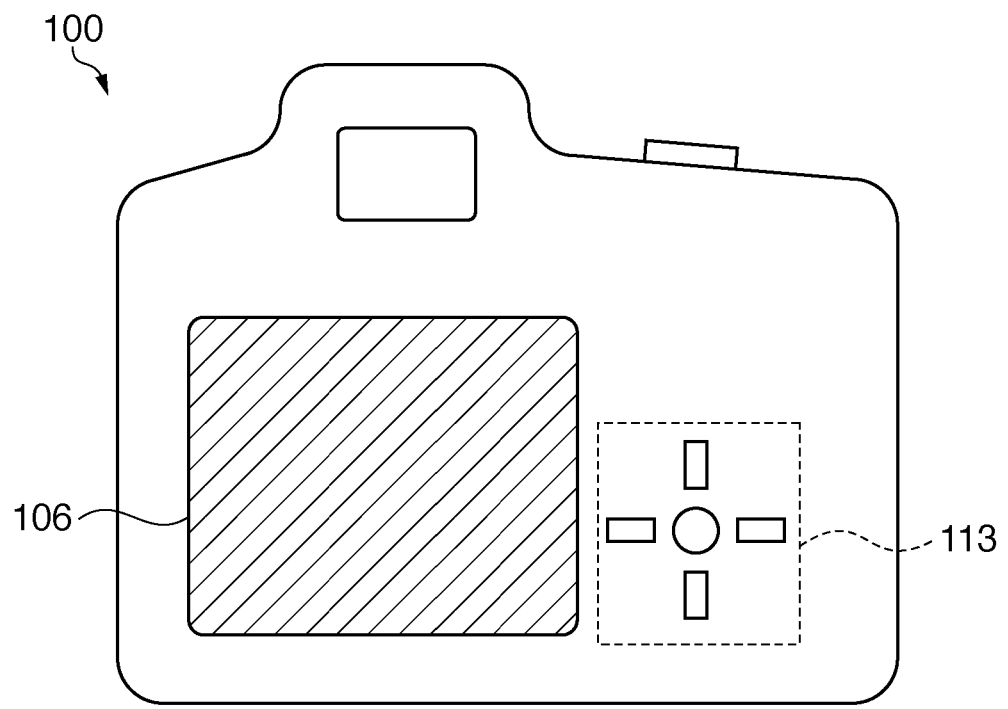
FIG. 2 is a rear view showing the information processing apparatus serving as a digital camera.

FIG. 2 is a view exemplifying the rear surface when the information processing apparatus 100 is implemented as a digital camera. On the rear surface, a liquid crystal panel corresponding to the display unit 106 and operation buttons corresponding to the operation unit 113 are arranged. While checking the display unit 106, the user manipulates the operation buttons of the operation unit 113 to, for example, request display of image data or change settings. If the information processing apparatus 100 can communicate with another information processing apparatus, image data and the like can be transmitted and received. For example, when receiving image data, image data the user wants is requested via the communication unit 104, received via the communication unit 104, and stored in the removable storage medium 109.

FIG. 3 is a table exemplifying a list of images stored in the removable storage medium 109 of each camera when camera A and camera B are assumed to be two information processing apparatuses that can communicate with each other. Each list manages information about the file name, shooting date & time, shooting location, main body data, and thumbnail data for one image data. The management form shown in FIG. 3 is merely an example, and main body data and thumbnail data may be managed separately.

In the following embodiment of the present invention, when one information processing apparatus is to request data of the other information processing apparatus, it transmits condition information which determines conditions for specifying the requested data. This condition information will be called "range information". The range information gives predetermined ranges about items including "location" and "time", such as the geographic range and temporal range. As for the location range, data associated with a shooting location or generation location falling within the location range are regarded as data which satisfy the condition. As for the temporal range, data having an update date & time or generation date & time falling within the temporal range are regarded as data which satisfy the condition.

Figure 4:
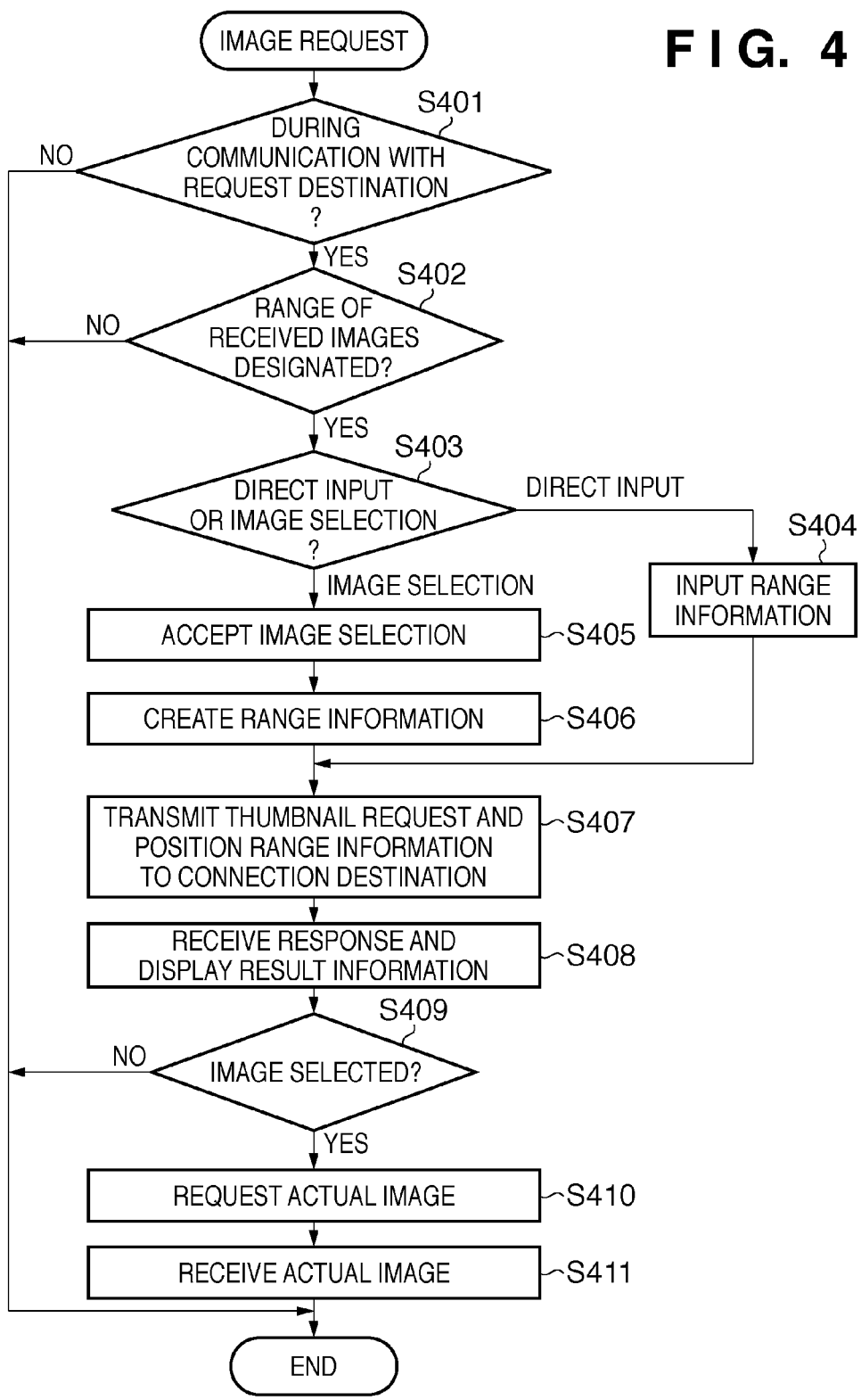
FIG. 4 is a flowchart exemplifying processing in the first embodiment.

Processing when transmitting an image data request from camera A to camera B after designating a range will be exemplified with reference to FIG. 4. The CPU 103 implements this processing by executing various programs stored in the program storage unit 107.

In step S401, the CPU 103 determines, based on a signal from the communication unit 104, whether camera A is communicating with camera B. If camera A is communicating, the process shifts to step S402; if NO, the process ends. In step S402, the CPU 103 determines, based on an operation accepted from the user via the operation unit 113, whether to designate the range of images to be received. If the CPU 103 determines to designate the range, the process shifts to step S403; if NO, the process ends. In step S403, the CPU 103 determines whether to designate the range by direct input or by selecting image data held in camera A. This determination is executed based on an operation by the user using a designation method selection GUI or the like displayed on the display unit 106. Note that the embodiment will explain a case in which the range is designated using information about the shooting location of image data. The range may be designated by further combining or singly using another associated information of image data such as the date & time (that is, shooting date & time) when the image data was generated.

If the CPU 103 determines in step S403 to designate the range by direct input, the process shifts to step S404, the CPU 103 executes the range information generation program 112 to accept input of position range information, and then the process shifts to step S407. The input can be done by, for example, inputting text data using the operation unit 113 or designating a position from map data. As the range information, for example, "from 139° to 140° east longitude, from 34° to 35° north latitude" can be input. Alternatively, input of information capable of specifying a position, such as the address, place name, prefecture name, or facility name, may be accepted to convert the accepted information into information about the latitude and longitude.

Figure 5A:
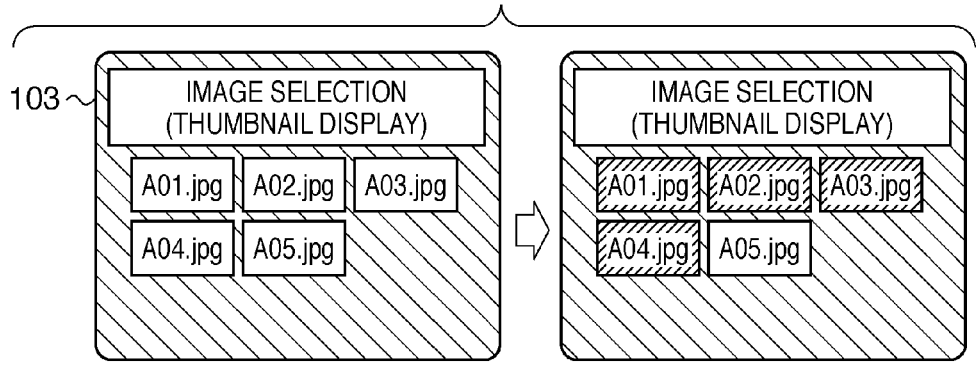
FIGS. 5A, 5B, and 5C are views for explaining an example of range designation in the first embodiment.

If the CPU 103 determines in step S403 to designate the range by image selection, the process shifts to step S405, and the CPU 103 executes the image selection program 111 to accept selection of an image. As the image selection method, when selecting images successively in time series, for example, selection of the first and final images is accepted, and all images between them can be automatically selected. For example, in FIG. 5A, images A01.jpg to A04.jpg are selected from images A01.jpg to A05.jpg shot by camera A. As the image selection method, images may be designated one by one, or all stored images may be designated.

After accepting selection in step S405, the CPU 103 executes the range information generation program 112 to generate range information in step S406, and then the process shifts to step S407. The range information generation method will be explained in more detail with reference to FIG. 5B. When four images A01.jpg to A04.jpg are selected in FIG. 5A, the CPU 103 reads out information about the shooting location of each image data from the removable storage medium. In this case, the CPU 103 can acquire four pieces of latitude/longitude information, so one rectangular region can be formed based on the latitudes and longitudes of the images A01.jpg to A04.jpg. Based on this rectangular region, range information "from 139° to 140° east longitude, from 34° to 35° north latitude" can be generated.

Figure 5B:
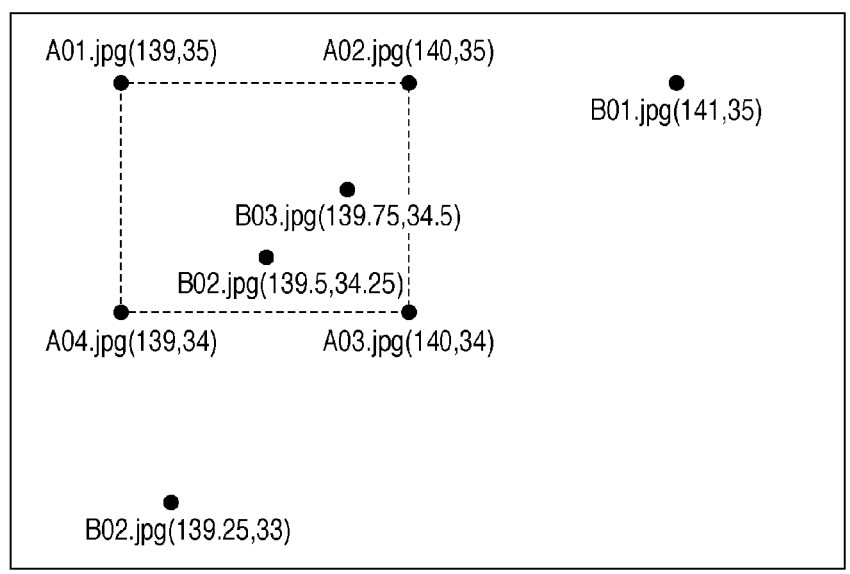

FIG. 5B shows four points. However, when a larger or smaller number of image data are selected, a region may be specified by setting corresponding coordinate points based on the pieces of latitude/longitude information. When more than two image data are selected, the CPU 103 can acquire more than two pieces of latitude/longitude information, so a certain region can be formed based on the acquired latitudes and longitudes of the selected images. Further, the region need not always be rectangular. For example, a region defined by an outline containing a plurality of selected positions, or a region obtained by expanding or deforming the region of the outline is also convenient. Alternatively, the region may be set as a rectangular region containing the region. Alternatively, the region may be specified by plotting the west and east ends of the longitude and the north and south ends of the latitude. A specified region may be expanded by a predetermined distance to generate range information. In the example of FIG. 5B, the region is defined by "from 139° to 140° east longitude, from 34° to 35° north latitude". However, the range may be expanded by 0.5° in both the latitude and longitude to generate range information "from 138.5° to 140.5° east longitude, from 33.5° to 35.5° north latitude". Alternatively, the user may modify range information generated from designated images. For example, the latitude and longitude values may be changeable in steps of 0.1°. Further, only one image data may be selected. In this case, a range based on the latitude and longitude of this image data may be specified. For example, when the selected image is at 139° east longitude and 34° north latitude, a range of ±0.5° can be given to set "from 138.5° to 139.5° east longitude, from 33.5° to 34.5° north latitude". When two image data are selected, the CPU 103 can acquire two pieces of latitude/longitude information. In this case, a rectangular or circular region having a diagonal or diameter defined by the acquired latitudes and longitudes of the selected two images can be formed.

Figure 5C:
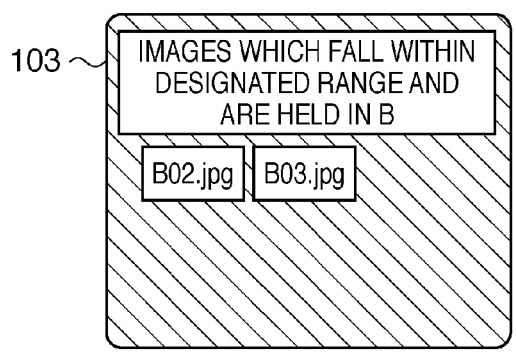

In step S407, the CPU 103 executes the image request program 110 to transmit a thumbnail request and the generated range information to connected camera B via the communication unit 104. In step S408, the communication unit 104 receives a response from camera B. If camera B holds image data falling within the range information, the received response contains the thumbnail image of the image data, and the display unit 106 displays the thumbnail. FIG. 5C shows a display example at this time. If camera B does not hold image data falling within the range information, the received response does not contain the thumbnail image of the image data. In this case, the display unit 106 displays a message that there is no target image data. The user confirms the displayed thumbnail image, and if he wants to request this image of camera B, can select the target thumbnail image via the operation unit 113. For example, the user may request both or only one of the actual images of B02.jpg and B03.jpg in FIG. 5C.

In step S409, the CPU 103 determines whether it has accepted selection of a thumbnail image whose actual image is to be requested of camera B. If the user does not request the actual image, the process ends. If the CPU 103 accepts selection of a thumbnail image, the process shifts to step S410. In step S410, the CPU 103 executes the image request program 110, and transmits an actual image request based on the file name of the selected image to camera B via the communication unit 104. In step S411, image data of the actual image transmitted from camera B in response to the request is received by the communication unit 104, and stored in the removable storage medium 109. At this time, the data list in the removable storage medium 109 is updated.

In FIG. 4, data of a thumbnail image is acquired first, and then data of the main body image is acquired. However, an actual image corresponding to range information may be directly acquired by omitting acquisition of data of a thumbnail image.

The above-described embodiment assumes the information processing apparatus 100 as a digital camera. However, the information processing apparatus is not always limited to a digital camera, and may be a camera-equipped cell phone, smart phone, or camera-equipped portable electronic device (for example, PDA). The present invention is applicable to even a device which does not have the camera function but can manage image data and exchange image data through communication with another apparatus. For example, a personal computer (PC) can manage and share image data by applying the present invention regardless of whether the PC has the camera function. Also, target data exchanged between information processing apparatuses are not limited to image data, and may be audio data or document data. At this time, data generation location information may be acquired using the GPS receiver 105, and associated with data.

As described above, according to the first embodiment, the range of image data to be acquired from another information processing apparatus can be specified using information of image data stored in the information processing apparatus of the user. This range designation method allows intuitively designating a range rather than inputting latitude/longitude information by direct input, implementing more reliable range designation. Even if a long time has elapsed after the shooting time, the position and date & time can be easily estimated by referring to image data, and the range can be designated easily.

[Second Embodiment]

Figure 6:
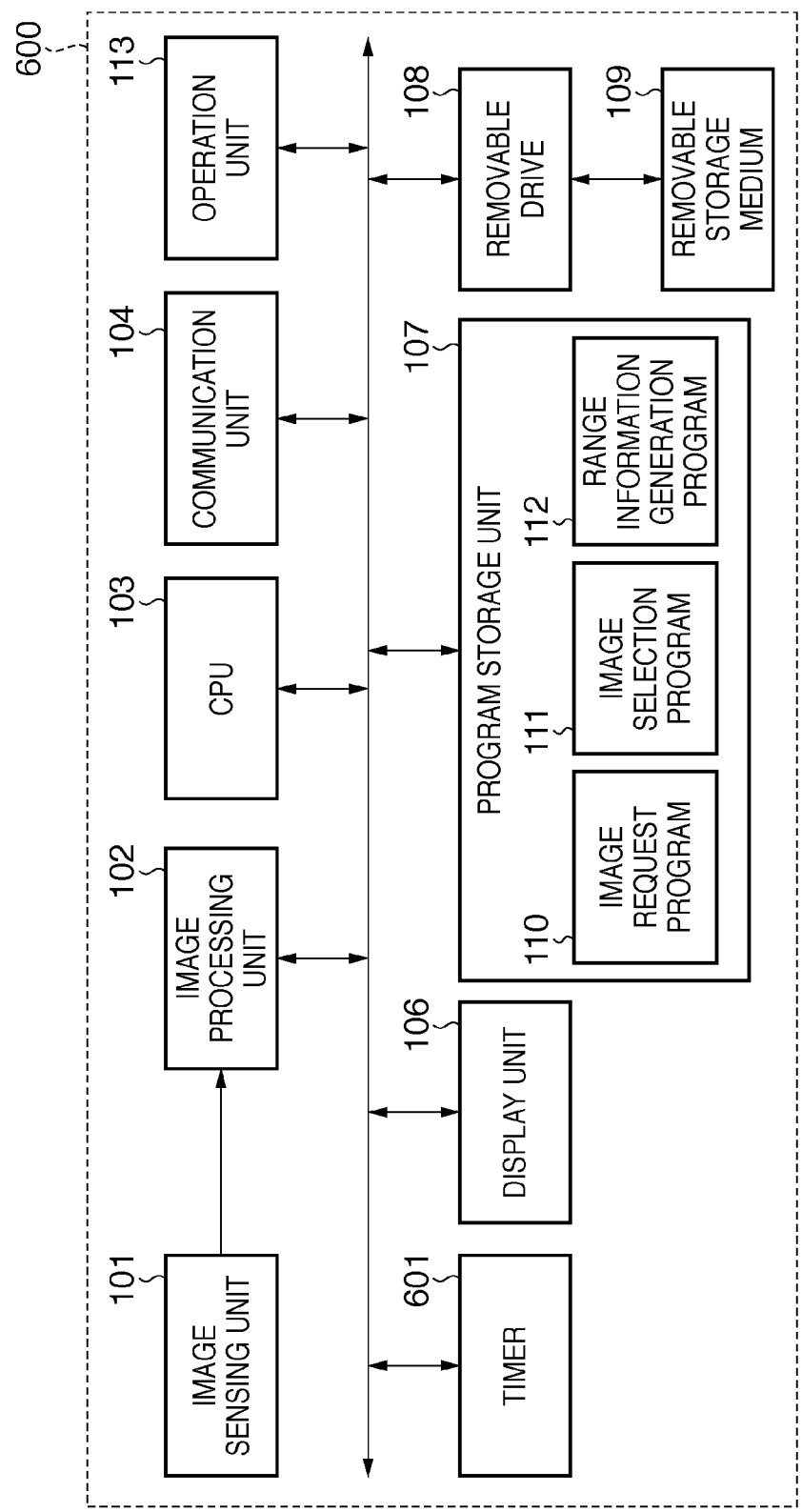
FIG. 6 is a block diagram exemplifying the arrangement of an information processing apparatus according to the second embodiment.

FIG. 6 exemplifies the arrangement of an information processing apparatus according to the second embodiment. An implementation of the information processing apparatus is the same as that in the first embodiment. The information processing apparatus in the second embodiment has almost the same arrangement as that of the information processing apparatus 100 in the first embodiment except that a timer 601 replaces the GPS receiver 105. In the second embodiment, when recording image data obtained by an image sensing unit 101 in a removable storage medium 109 via a removable drive 108, time information can be generated by the timer 601 and recorded as associated information together with the image data.

FIG. 7 is a table exemplifying a list of images stored in the removable storage medium 109 of each camera when camera C and camera D are assumed as two information processing apparatuses communicable with each other. Each list manages information about the file name, shooting time, event, main body data, and thumbnail data for one image data. The management form shown in FIG. 3 is merely an example, and main body data and thumbnail data may be managed separately.

Processing when transmitting a thumbnail browsing request from camera C to camera D after designating a range will be exemplified with reference to FIG. 4. A CPU 103 implements this processing by executing various programs stored in a program storage unit 107. The second embodiment assumes that the set times of camera C and camera D coincide with each other. However, it is also possible to check the set time difference or set time change history at the start of communication, correct the time range to one reflecting the intension of a user who manipulates camera C, and transmit the corrected time range to camera D.

In step S401, the CPU 103 determines, based on a signal from a communication unit 104, whether camera C is communicating with camera D. If camera C is communicating, the process shifts to step S402; if NO, the process ends. In step S402, the CPU 103 determines whether to designate the range of images to be received. If the CPU 103 determines to designate the range, the process shifts to step S403; if NO, the process ends. In step S403, the CPU 103 determines whether to designate the range by direct input or by selecting image data held in camera C. The second embodiment will explain a case in which the range is designated using information about the shooting date & time of image data. Note that the range may be designated by using another associated information of image data or further using shooting location information, similar to the first embodiment.

If the CPU 103 determines in step S403 to designate the range by direct input, the process shifts to step S404, the CPU 103 executes a range information generation program 112 to accept input of time information, and then the process shifts to step S407. The input can be done by, for example, inputting text data using an operation unit 113 or designating a date from the calendar. As the range information, for example, "2010/4/30 10:16 am to 2010/4/30 10:19 am" can be input.

If the CPU 103 determines in step S403 to designate the range by image selection, the process shifts to step S405, and the CPU 103 executes an image selection program 111 to accept selection of an image. As the image selection method, when selecting images successively in time series, for example, selection of the first and final images is accepted, and all images between them can be automatically selected. For example, in FIG. 8A, C13.jpg to C17.jpg representing a mock cavalry battle in an athletic meeting are selected from images C11.jpg to C19.jpg shot by camera C. As the image selection method, images may be designated one by one, or all stored images may be designated.

Figure 8A:
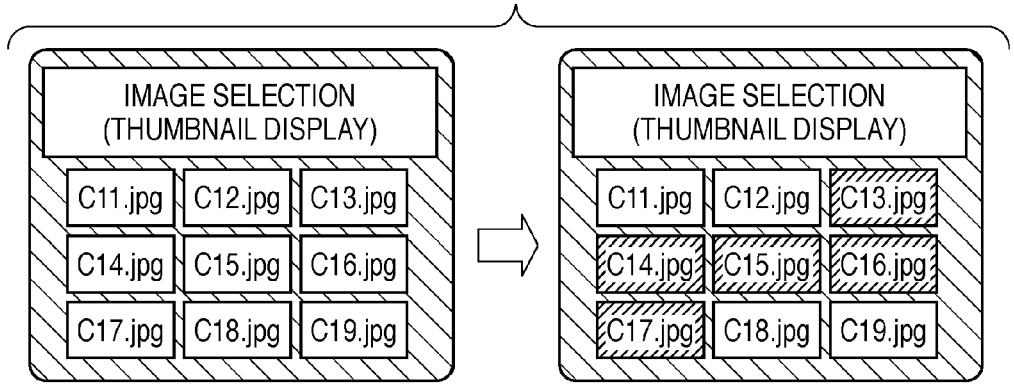
FIGS. 8A, 8B, and 8C are views for explaining an example of range designation in the second embodiment.

After accepting selection in step S405, the CPU 103 executes the range information generation program 112 to generate range information in step S406, and then the process shifts to step S407. The range information generation method will be explained. When five images C13.jpg to C17.jpg are selected in FIG. 8A, the CPU 103 reads out information about the shooting date & time of each image data from the removable storage medium. Range information is then generated based on pieces of range information about the oldest date & time and the latest date & time. That is, "2010/4/30 10:16 am to 2010/4/30 10:19 am" serves as range information. In this case, four images D14.jpg to D17.jpg are selected in camera D. Range information may be generated by expanding a specified range by a predetermined time. For example, the time range of 10:16 to 10:19 may be expanded by 1 min at each of the start and end of the range, generating range information of 10:15 to 10:20. When the range is expanded in this way, five images D13.jpg to D17.jpg are selected in camera D. Alternatively, the user may modify range information generated from designated images. For example, the time or date information may be changeable. FIG. 8A shows a case where five images are selected, however, a larger or smaller number of images may be selected. For example, more than two images may be selected. Further, only one image data may be selected. In this case, a range based on the shooting date & time of this image data may be specified. For example, when the selected image has a shooting date & time of 2010/4/30 10:16 am, a range of ±5 min can be given to set "2010/4/30 10:11 am to 2010/4/30 10:21 am".

Figure 8B:
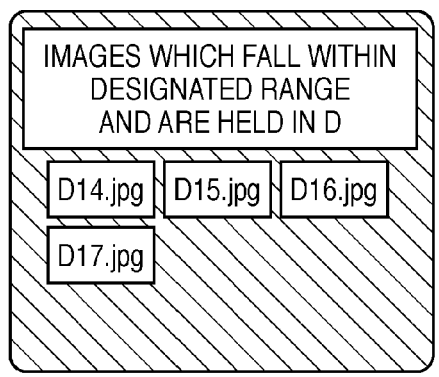
Figure 8C:
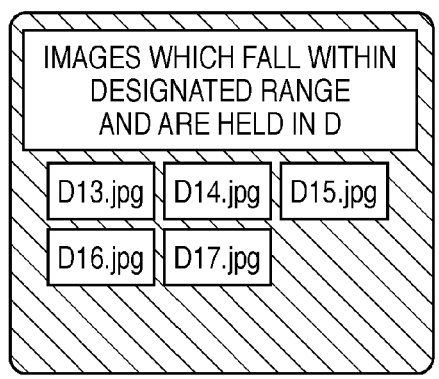

In step S407, the CPU 103 executes an image request program 110 to transmit a thumbnail request and the generated range information to connected camera D via the communication unit 104. In step S408, the communication unit 104 receives a response from camera D. If camera D holds image data falling within the range information, the received response contains the thumbnail image of the image data, and a display unit 106 displays the thumbnail. FIGS. 8B and 8C show display examples at this time. FIG. 8B shows a case in which the range information is "2010/4/30 10:16 am to 2010/4/30 10:19 am". FIG. 8C shows a case in which the range information is "2010/4/30 10:15 am to 2010/4/30 10:20 am" expanded by 1 min at each of the start and end of the range.

If camera D does not hold image data falling within the range information, the received response does not contain the thumbnail image of the image data. In this case, the display unit 106 displays a message that there is no target image data. The user confirms the displayed thumbnail image, and if he wants to request this image of camera D, can select the target thumbnail image via the operation unit 113. For example, the user may request all or one of the actual images of D13.jpg to D17.jpg in FIG. 8C.

In step S409, the CPU 103 determines whether it has accepted selection of a thumbnail image whose actual image is to be requested of camera D. If the user does not request the actual image, the process ends. If the CPU 103 accepts selection of a thumbnail image, the process shifts to step S410. In step S410, the CPU 103 executes the image request program 110, and transmits an actual image request based on the file name of the selected image to camera D via the communication unit 104. In step S411, image data of the actual image transmitted from camera D in response to the request is received by the communication unit 104, and stored in the removable storage medium 109. At this time, the data list in the removable storage medium 109 is updated.

Note that even the second embodiment has explained a case in which thumbnail image data is acquired first and then actual image data is acquired. However, an actual image corresponding to range information may be directly acquired by omitting acquisition of thumbnail image data.

Also in the second embodiment, target data exchanged between information processing apparatuses are not limited to image data, and may be audio data or document data. At this time, information about the data generation date & time and update date & time may be acquired using the timer 601, and associated with data.

As described above, according to the second embodiment, the range of image data to be acquired from another information processing apparatus can be specified using information of image data stored in the information processing apparatus of the user. This range designation method allows intuitively designating a range rather than inputting date & time information by direct input, implementing more reliable range designation. Even if a long time has elapsed after the shooting time, the date & time can be easily estimated by referring to image data, and the range can be designated easily.

[Third Embodiment]

The present invention described above is applicable even when a personal computer (PC) is to copy a file. The third embodiment will explain a case in which a request to copy data in a removable storage medium to the internal storage unit of the PC is generated.

Figure 9:
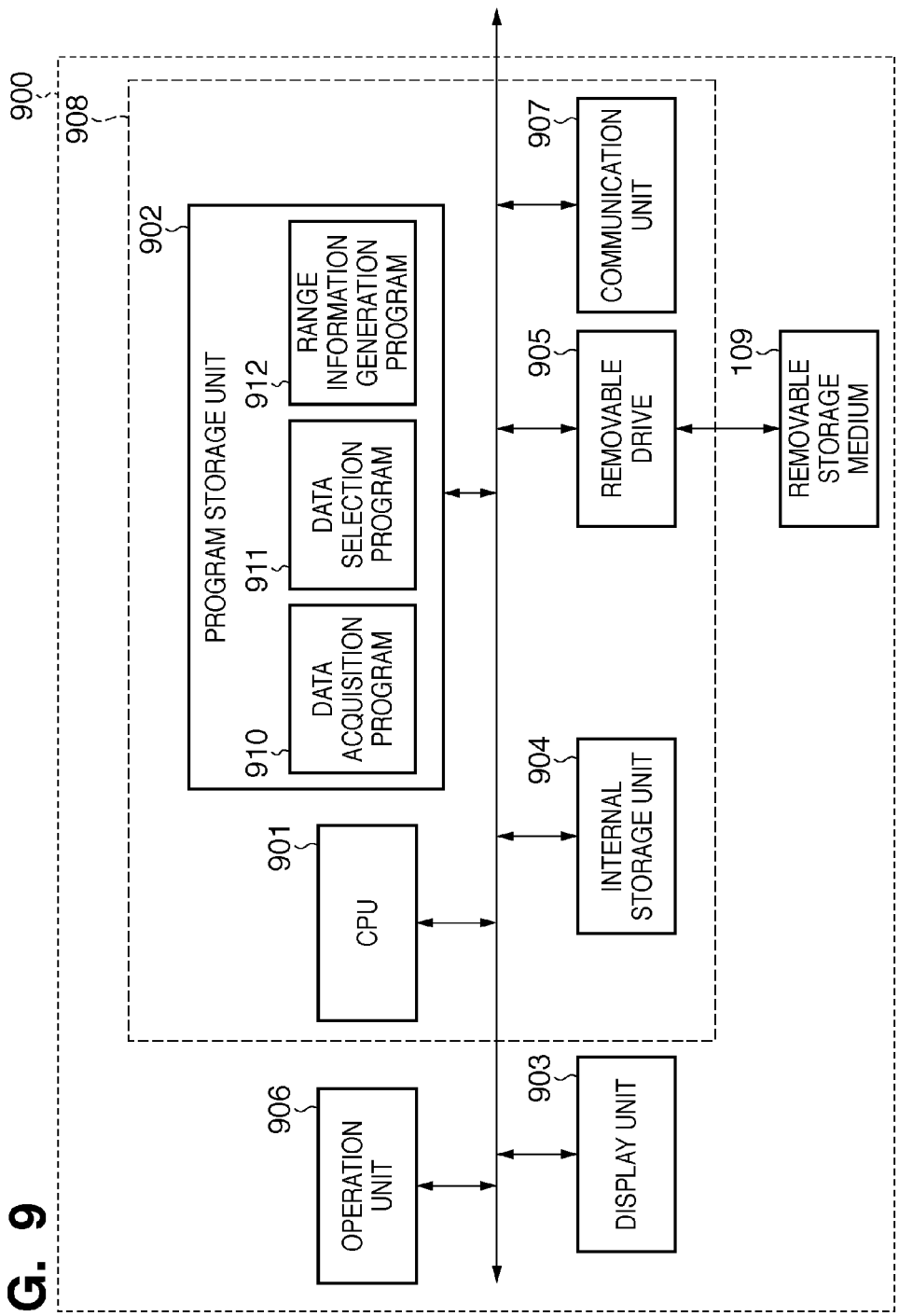
FIG. 9 is a block diagram exemplifying the arrangement of an information processing apparatus according to the third embodiment.

FIG. 9 is a block diagram exemplifying the arrangement of an information processing apparatus serving as a personal computer according to the third embodiment. Referring to FIG. 9, a CPU 901 controls an information processing apparatus 900 by executing a program stored in a program storage unit 902 or internal storage unit 904. The program storage unit 902 stores programs to be executed by the CPU 901. These programs include a data acquisition program 910, data selection program 911, and range information generation program 912. The program storage unit 902 is formed from a ROM, RAM, hard disk, and the like.

A display unit 903 displays data stored in a removable storage medium 109 and data stored in the internal storage unit 904. The display unit 903 is formed from a liquid crystal panel or the like. The internal storage unit 904 is a storage device such as a hard disk or flash Memory®, and can store various programs and data. A removable drive 905 controls read/write of data from/in the removable storage medium 109. The removable storage medium 109 is a nonvolatile storage medium which is mounted in the removable drive 905 and used. An operation unit 906 is a user interface for accepting a shooting instruction, selection instruction, and the like from the user, and includes a mouse and keyboard. A communication unit 907 is a communication interface which communicates with an external information processing apparatus. Examples of the communication protocol are TCP/IP, USB, IEEE1394, IEEE802.11n, and Bluetooth. A range surrounded by a dotted line 908 represents building components which can be configured as the main body of the personal computer.

In the third embodiment, when the user requests copying of data from the removable storage medium 109 to the internal storage unit 904, the CPU 901 executes a program in the program storage unit 902. The CPU 901 reads out recorded data from the removable storage medium 109 and copies it in the internal storage unit 904. The user can issue a data copy request by manipulating the operation unit 906 while checking the display unit 903.

Figure 10:
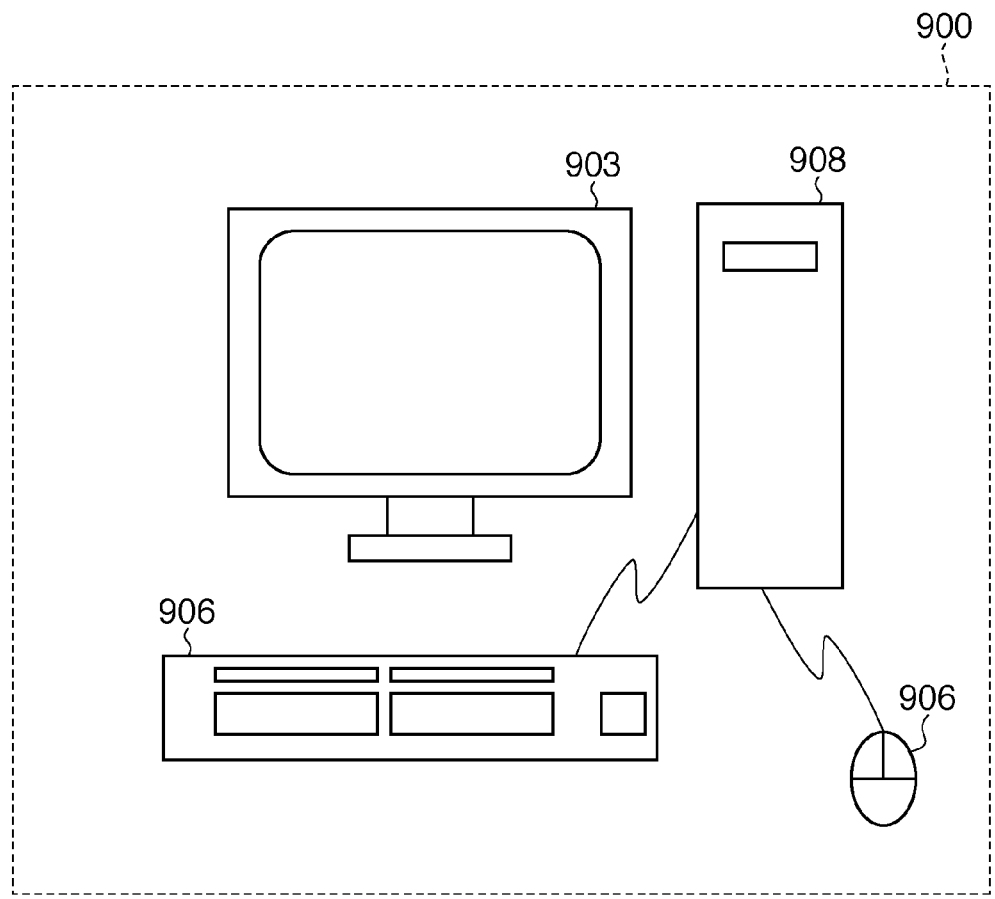
FIG. 10 is a view exemplifying the arrangement of a PC serving as the information processing apparatus in the third embodiment.

FIG. 10 is a view exemplifying the outer appearance of the information processing apparatus 900 serving as a PC. Reference numerals correspond to the building components in FIG. 9.

FIGS. 11A and 11B are tables exemplifying lists of data stored in the internal storage unit 904 and removable storage medium 109 in the information processing apparatus 900. Each list manages information about the file name, update date & time, extension, and main body data for one image data. The management form shown in FIGS. 11A and 11B is merely an example, and main body data may be managed separately. As for newly created data, the update date & time is the creation date & time.

Figure 12:
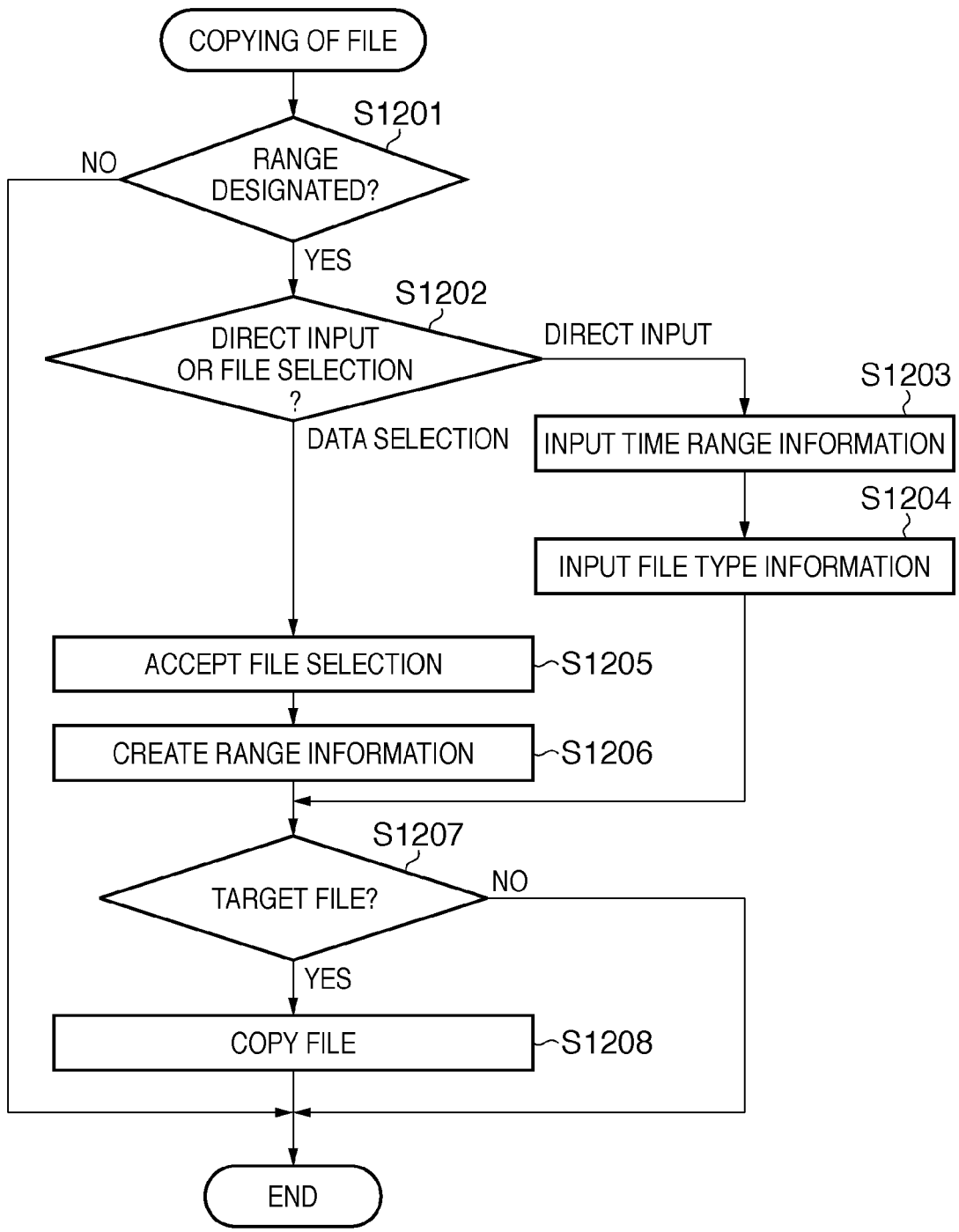
FIG. 12 is a flowchart exemplifying processing in the third embodiment.

Processing when copying data from the removable storage medium 109 to the internal storage unit 904 after designating a range will be exemplified with reference to FIG. 12.

In step S1201, the CPU 901 determines whether to designate the range of images to be copied. If the CPU 901 determines to designate the range, the process shifts to step S1202; if NO, the process ends. In step S1202, the CPU 901 determines whether to designate the range by direct input or by selecting data stored in the internal storage unit 904. The third embodiment will explain a case in which the range is designated using information about the update date & time and extension of data. Note that the range may be designated by further combining or singly using another associated information of data such as the file name. If the CPU 901 determines to designate the range by direct input, it executes the range information generation program 912 to accept input of an update date & time range and a file type corresponding to the extension based on the manipulation of the keyboard or mouse of the operation unit 906 in steps S1203 and S1204. Further, the CPU 901 generates range information based on the accepted input information, and then the process shifts to step S1207. If the CPU 901 determines in step S1202 to designate the range by data selection, the process shifts to step S1205, and the CPU 901 executes the data selection program 911 to accept selection of data for designating a range. In step S1206, the CPU 901 generates range information based on the selected data.

As the data selection method, when selecting data successively in time series, selection of the first and final data is accepted. Alternatively, the user may select data one by one and after the end of selecting data he wants, perform a selection end operation. For example, when text files E01.txt, E03.txt, and E06.txt are selected from data E01 to E06, the range information generation program 912 creates range information "text files updated during a period of 15:00 to 17:00. Note that the user may modify generated range information. For example, the update time may be changed, or a new data type (extension) may be added. Further, only one data may be selected. In this case, a range based on the update date & time of this data may be specified. For example, when the update date & time of the selected data is 2010/4/30 10:00 am, a range of ±1 h can be given to set "2010/4/30 9:00 am to 2010/4/30 11:00 am".

The range information generation method will be explained in more detail. First, the CPU 901 acquires information about the extensions and update dates & times of designated data from the internal storage unit 904. Then, the CPU 901 specifies the latest and oldest dates & times among the acquired update dates & times, and specifies an update date & time range. The CPU 901 specifies the type of file to be designated based on the acquired extension. In the above-described example, only text files are selected, but files of a plurality of types may be selected.

In step S1207, the CPU 901 executes the data acquisition program 910 to determine, based on the range information, whether target data exists in the removable storage medium 109. If target data exists, it is copied from the removable storage medium 109 to the internal storage unit 904. At this time, the data list in the internal storage unit 904 is updated. In the above example, data corresponding to the range information "text files updated during a period of 15:00 to 17:00" are text files F03 and F04. Hence, the display unit 903 displays F03.txt and F04.txt as data copied from the removable storage medium. Display icons to be used can be icons managed by the OS of the information processing apparatus 900. If data corresponding to the designated range information does not exist, the process ends. If no such file exists, a warning may be displayed.

As described above, according to the third embodiment, the range of data to be acquired from the connected removable storage medium 109 can be specified using information about the update date & time of data stored in the information processing apparatus of the user and about an extension indicating the type of data. This range designation method allows intuitively designating a range rather than inputting the update date & time or type of data by direct input, implementing more reliable range designation. Even if a long time has elapsed after the data update time, the update date & time and type can be easily estimated by referring to data, and the range can be designated easily.

[Fourth Embodiment]

In the first and second embodiments, cameras communicate with each other. However, an information processing apparatus 100 may be a PC, so the present invention is established even if the PC replaces camera B or D. The PC has the arrangement of FIG. 9 in the third embodiment. In this case, when camera A or C can transmit/receive data to/from the PC, the camera generates range information and transmits it to the PC. In the PC, a CPU 901 selects data corresponding to the range information from an internal storage unit 904, and transmits it to camera A or C via a communication unit 907. Note that an actual image may be transmitted after transmitting a thumbnail first, or may be transmitted first.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-110591, filed May 12, 2010 which is hereby incorporated by reference herein in its entirety.

What is claimed is:

1. An information processing apparatus which acquires, from another information processing apparatus, data stored in the other information processing apparatus, comprising:
   a storage unit configured to store data;
   a selection unit configured to select data stored in said storage unit;
   a generation unit configured to generate, based on the data selected by said selection unit, condition information that determines a condition for specifying data to be requested to the other information processing apparatus; and
   a communication unit configured to transmit the condition information to the other information processing apparatus and to receive, from the other information processing apparatus, data that satisfies the condition determined by the condition information,
   wherein said storage unit stores information about a generation location of the data in association with the data, and
   said generation unit generates, based on information about generation locations of a plurality of data selected by said selection unit, condition information that determines a condition regarding a range of locations where data to be acquired from the other information processing apparatus were generated.

2. The apparatus according to claim 1, wherein
   the information about generation locations includes information of a latitude and longitude,
   the location condition is a geographic range specified based on a latitude and longitude of the designated data, and
   the data that satisfies the condition is data whose generation location falls within the geographic range.

3. The apparatus according to claim 1, wherein, when said selection unit selects more than two data, said generation unit generates condition information containing a plurality of generation locations associated with the selected more than two data.

4. The apparatus according to claim 1, wherein
   the data is image data, and the generation location is a shooting location of the image data, and
   when said communication unit receives thumbnail images of image data that satisfy the condition, said selection unit further selects, from the received thumbnail images, a thumbnail image whose main body image data is to be requested, and said communication unit transmits, to the other information processing apparatus, a main body image data request based on the thumbnail image selected by said selection unit, and receives main body image data corresponding to the request from the other information processing apparatus.

5. An information processing apparatus which acquires, from another information processing apparatus, data stored in the other information processing apparatus, comprising:
   a storage unit configured to store data;
   a selection unit configured to select more than two data stored in said storage unit;
   a generation unit configured to generate, based on the more than two data selected by said selection unit, condition information that determines a condition for specifying data to be requested to the other information processing apparatus; and
   a communication unit configured to transmit the condition information to the other information processing apparatus and to receive, from the other information processing apparatus, data that satisfies the condition determined by the condition information,
   wherein said storage unit stores time information about a generation or update date and time of the data in association with the data, and
   said generation unit generates, based on pieces of time information of the more than two data selected by said selection unit, condition information that determines a condition regarding a range of times when data to be acquired from the other information processing apparatus were generated or updated.

6. The apparatus according to claim 5, wherein
   said storage unit stores information about a generation location of the data further in association with the data, and said generation unit generates, based on the information about generation locations of the more than two data selected by said selection unit, condition information that further determines a condition regarding a range of locations where data to be acquired from the other information processing apparatus were generated.

7. The apparatus according to claim 5, wherein
the data is image data, and the generation location is a shooting location of the image data, and
when said communication unit receives thumbnail images of image data that satisfy the condition, said selection unit further selects, from the received thumbnail images, a thumbnail image whose main body image data is to be requested, and said communication unit transmits, to the other information processing apparatus, a main body image data request based on the thumbnail image selected by said selection unit, and receives main body image data corresponding to the request from the other information processing apparatus.

8. A method of controlling an information processing apparatus which includes a storage unit for storing data, and acquires, from another information processing apparatus, data stored in the other information processing apparatus, comprising:
 a selection step of causing a selection unit to select data stored in the storage unit;
 a generation step of causing a generation unit to generate, based on the data selected in the selection step, condition information that determines a condition for specifying data to be requested of the other information processing apparatus; and
 a communication step of causing a communication unit to transmit the condition information to the other information processing apparatus and receive, from the other information processing apparatus, data that satisfies the condition determined by the condition information,
 wherein the storage unit stores information about a generation location of the data in association with the data, and
 in the generation step, condition information that determines a condition regarding a range of locations where data to be acquired from the other information processing apparatus were generated is generated based on information about generation locations of a plurality of data selected in the selection step.

9. A method of controlling an information processing apparatus which includes a storage unit for storing data, and acquires, from another information processing apparatus, data stored in the other information processing apparatus, comprising:
 a selection step of causing a selection unit to select more than two data stored in the storage unit;
 a generation step of causing a generation unit to generate, based on the more than two data selected in the selection step, condition information that determines a condition for specifying data to be requested of the other information processing apparatus; and
 a communication step of causing a communication unit to transmit the condition information to the other information processing apparatus and receive, from the other information processing apparatus, data that satisfies the condition determined by the condition information,
 wherein the storage unit stores time information about a generation or update date & time of the data in association with the data, and
 in the generation step, condition information that determines a condition regarding a range of times when data to be acquired from the other information processing apparatus were generated or updated is generated based on pieces of time information of the more than two data selected in the selection step.

10. A non-transitory computer readable storage medium storing a computer program which causes an information processing apparatus including a storage unit for storing data, to execute a method for controlling the information processing apparatus and acquiring, from another information processing apparatus, data stored in the other information processing apparatus, the method comprising:
 a selection step of causing a selection unit to select data stored in the storage unit;
 a generation step of causing a generation unit to generate, based on the data selected in the selection step, condition information that determines a condition for specifying data to be requested of the other information processing apparatus; and
 a communication step of causing a communication unit to transmit the condition information to the other information processing apparatus and receive, from the other information processing apparatus, data that satisfies the condition determined by the condition information,
 wherein the storage unit stores information about a generation location of the data in association with the data, and
 in the generation step, condition information that determines a condition regarding a range of locations where data to be acquired from the other information processing apparatus were generated is generated based on information about generation locations of a plurality of data selected in the selection step.

11. A non-transitory computer readable storage medium storing a computer program which causes an information processing apparatus including a storage unit for storing data, to execute a method for controlling the information processing apparatus and acquiring, from another information processing apparatus, data stored in the other information processing apparatus, the method comprising:
 a selection step of causing a selection unit to select more than two data stored in the storage unit;
 a generation step of causing a generation unit to generate, based on the more than two data selected in the selection step, condition information that determines a condition for specifying data to be requested of the other information processing apparatus; and
 a communication step of causing a communication unit to transmit the condition information to the other information processing apparatus and receive, from the other information processing apparatus, data that satisfies the condition determined by the condition information,
 wherein the storage unit stores time information about a generation or update date & time of the data in association with the data, and
 in the generation step, condition information that determines a condition regarding a range of times when data to be acquired from the other information processing apparatus were generated or updated is generated based on pieces of time information of the more than two data selected in the selection step.

* * * * *